(12) United States Patent
Kiehn et al.

(10) Patent No.: US 10,502,612 B2
(45) Date of Patent: Dec. 10, 2019

(54) DEVICE AND METHOD FOR WEIGHING FILLED CAPSULES

(71) Applicant: Harro Hoefliger Verpackungsmaschinen GmbH, Allmersbach im Tal (DE)

(72) Inventors: Uwe Kiehn, Allmersbach im Tal (DE); Thomas Puppich, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 223 days.

(21) Appl. No.: 15/854,562

(22) Filed: Dec. 26, 2017

(65) Prior Publication Data

US 2018/0180462 A1    Jun. 28, 2018

(30) Foreign Application Priority Data

Dec. 23, 2016   (EP) ..................................... 16002741

(51) Int. Cl.
    *G01G 13/02*      (2006.01)
    *G01G 17/00*      (2006.01)
    (Continued)

(52) U.S. Cl.
     CPC .............. *G01G 13/02* (2013.01); *A61J 3/074* (2013.01); *B65B 1/46* (2013.01); *G01G 13/026* (2013.01);
    (Continued)

(58) Field of Classification Search
     CPC ...... G01G 13/03; G01G 13/026; G01G 17/00; G01G 21/22; G01G 21/23; A61J 3/074;
    (Continued)

(56) References Cited

U.S. PATENT DOCUMENTS 3,434,595 A *   3/1969   Seaborn .................... B07C 5/18
                                                               209/595
5,852,259 A *   12/1998   Yanase .................... G01G 17/00
                                                               177/145

(Continued)

FOREIGN PATENT DOCUMENTS

DE     102008027624 A1    12/2009
WO         9731244 A1     8/1997
WO      2012023118 A1     2/2012

*Primary Examiner* — Randy W Gibson
(74) *Attorney, Agent, or Firm* — Walter Ottesen, P.A.

(57) ABSTRACT

A device and a method are for weighing capsules having a filling. The device has a weighing unit having a receptacle, a transporter for transporting individual capsules to the weighing unit in a direction of movement, and a stopping device. The receiving section of the receptacle is configured as a friction support and is inclined with respect to a horizontal direction. Upon reaching the weighing unit, the capsule is stopped from moving in the movement direction via the stopping device and is deposited in the receiving section in an inclined manner such that a front end, with regard to the movement direction, of the capsule is located lower down than a rear end of the capsule, and such that the capsule comes to rest on the receptacle in this position and with regard to the direction of movement solely because of static friction. The capsule is then weighed.

9 Claims, 3 Drawing Sheets

(51) Int. Cl.
*G01G 21/22* (2006.01)
*A61J 3/07* (2006.01)
*B07C 5/18* (2006.01)
*B65B 1/46* (2006.01)

(52) U.S. Cl.
CPC ............. *G01G 17/00* (2013.01); *G01G 21/22* (2013.01); *A61J 2200/74* (2013.01); *B07C 5/18* (2013.01); *B07C 2501/0081* (2013.01)

(58) Field of Classification Search
CPC .................. A61J 2200/74; B07C 5/18; B07C 2501/0081; B65B 1/46
See application file for complete search history.

(56) References Cited

U.S. PATENT DOCUMENTS

| | | | | |
|---|---|---|---|---|
| 6,114,636 A * | 9/2000 | Cane' | .................... | G01G 17/00 177/145 |
| 6,162,998 A * | 12/2000 | Wurst | .................... | G01G 17/00 177/145 |
| 8,350,164 B2 * | 1/2013 | Wang | ....................... | A61J 3/074 177/116 |
| 2003/0019797 A1 * | 1/2003 | Yamamoto | ................ | B07C 5/18 209/592 |
| 2013/0206484 A1 * | 8/2013 | Consoli | ................... | A61J 3/074 177/1 |

\* cited by examiner

U.S. Patent Dec. 10, 2019 Sheet 1 of 3 US 10,502,612 B2
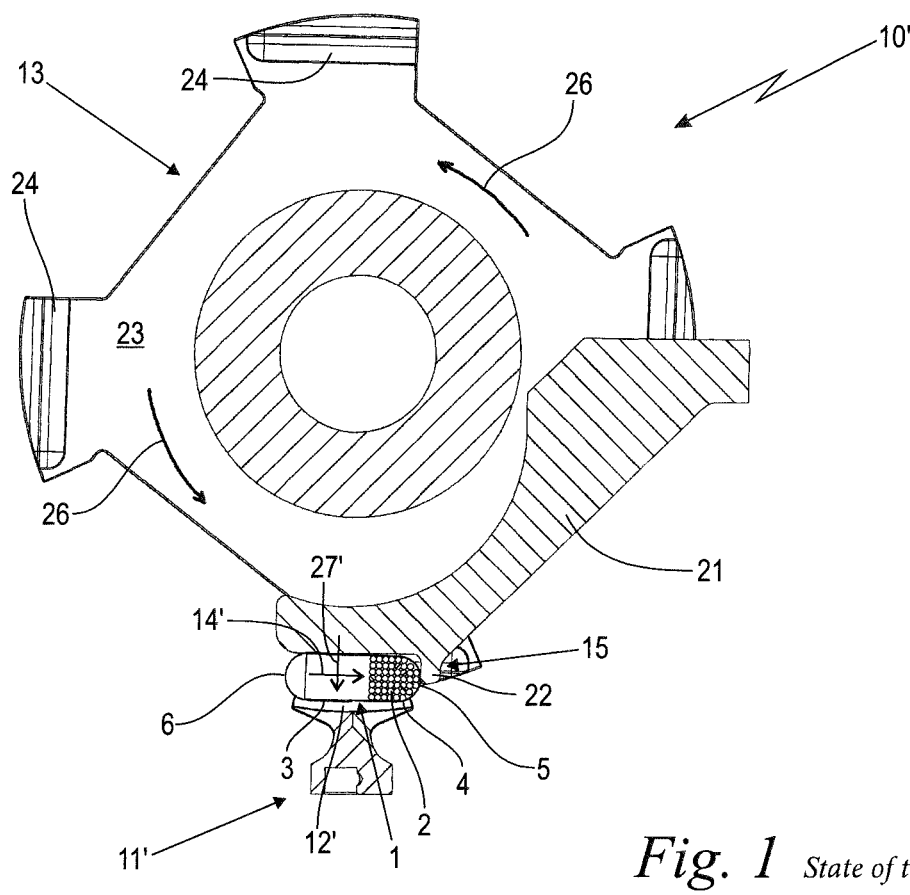
*Fig. 1* State of the art
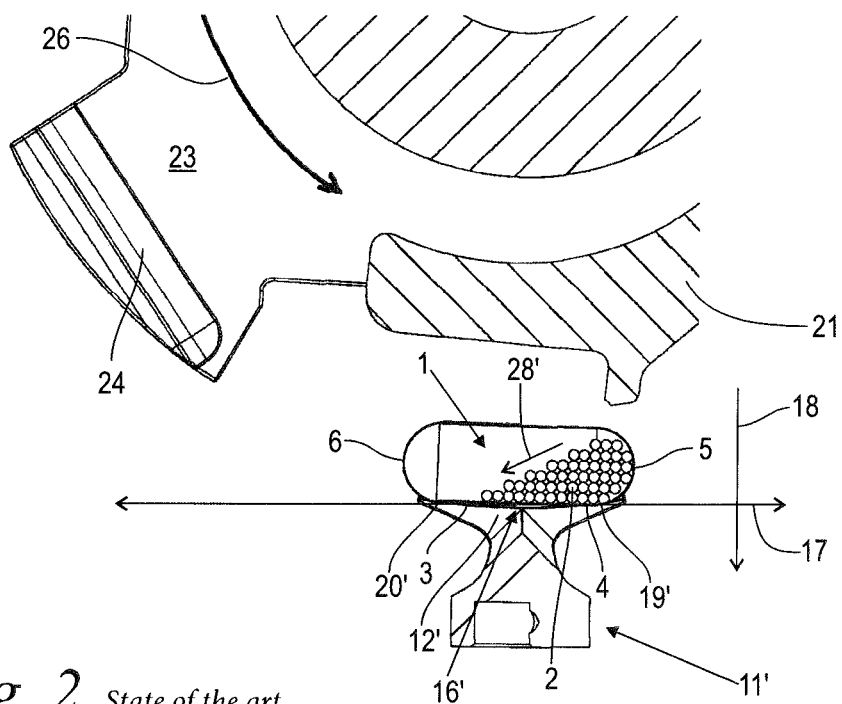
*Fig. 2* State of the art

DEVICE AND METHOD FOR WEIGHING FILLED CAPSULES

CROSS REFERENCE TO RELATED APPLICATION

This application claims priority of European patent application no. 16 002 741.3, filed Dec. 23, 2016, the entire content of which is incorporated herein by reference.

FIELD OF THE INVENTION

The invention relates to a device for weighing capsules and to a method for weighing capsules via such a device.

BACKGROUND OF THE INVENTION

In the pharmaceutical sector and also in the dietary supplement sector, numerous preparations are filled into capsules which are intended to be taken orally. In the case of various preparations, it is important that they are prepared as a single dose in the capsule with a fixedly defined and exactly contained mass. Suitable metering devices and methods are intended to ensure that very tight mass tolerances of for example ±2 mg are maintained under the conditions of high-volume filling.

Such requirements placed on the target mass are increasingly also associated with the desire for suitable testing and verification measures. In order to meet such demands, in particular capsule filling machines constructed in a multi-track manner and multitrack weighing systems are in use. The filled capsules are either checked for the correct filling quantity at random or, given a corresponding requirement, fed to a 100% in-process control. To this end, the capsules are conveyed to a multitrack capsule weighing machine. If there is no direct connection, the capsule weighing machine can also be loaded manually. In the capsule weighing machine, a capsule transporter transports the individual capsules up to a weighing unit. Upon reaching the weighing unit, the capsule is stopped from moving via a stopping device and is subsequently deposited on a weighing receptacle of the weighing unit in a manner lying horizontally. Testing weighing of the filled capsule is carried out there before the latter is transported onward and is replaced on the weighing device by the next capsule.

The capsules can be weighed directly in single-track or multitrack capsule filling machines with a weighing device, or in a separate single-track or multitrack weighing machine. This weighing machine can be loaded directly by a capsule filling machine or be filled manually by hand. As a result, as per the above description, 100% in-process control is actually possible. However, it has been found that the weighing carried out in such a way represents the limiting factor as regards throughput speed and output quantity. For weight measurement to be carried out repeatably and exactly in the milligram range, each particular capsule has to rest completely still on the weighing receptacle. The capsule transported up at high speed thus first of all has to be braked, that is, stopped, and then deposited cleanly before the actual weighing operation can be carried out. For rapid onward transport, a high acceleration is then necessary again. In order, nevertheless, to have a sufficiently long rest phase for the measurement, a particular cycle rate of the machine overall must not be exceeded. An increase in the output quantity can only be achieved through an increase in the number of machine tracks under these conditions, this further increasing the investment costs, which are in any case already high, for the weighing device.

SUMMARY OF THE INVENTION

It is an object of the invention to provide a device for weighing filled capsules such that precise weighing is possible even at reduced cycle rates.

This object can, for example, be achieved by a device for weighing capsules with a filling. The device includes: a weighing unit having a weighing receptacle for a capsule; a capsule transporter configured to transport an individual one of the capsules to the weighing unit in a movement direction; a stop arrangement for the individual one of the capsules transported in the movement direction; the weighing receptacle having a receiving section including a front end and a back end with respect to the movement direction; the stop arrangement being configured to deposit a stopped individual one of the capsules in the receiving section; and, the receiving section of the weighing receptacle being configured as a friction support and being inclined with respect to the horizontal direction such that the front end of the receiving section lies lower than the back end of the receiving section.

It is a further object of the invention to provide a more rapid method for weighing capsules.

This object can, for example, be achieved by a method for weighing capsules with a filling via a device including a weighing unit having a weighing receptacle for a capsule, a capsule transporter configured to transport an individual one of the capsules to the weighing unit in movement direction, a stop arrangement for the individual one of the capsules transported in the movement direction, the weighing receptacle having a receiving section including a front end and a back end with respect to the movement direction, the stop arrangement being configured to deposit a stopped individual one of the capsules in the receiving section, and, the receiving section of the weighing receptacle being configured as a friction support and being inclined with respect to the horizontal direction such that the front end of the receiving section lies lower than the back end of the receiving section. The method includes the steps of: transporting a capsule at least partially filled with the filling via the capsule transporter to the weighing unit in a movement direction; stopping the capsule in its movement in the movement direction via the stop arrangement when the weighing unit is reached; depositing the stopped capsule in the receiving section in an inclined manner such that a front end of the capsule, with respect to the movement direction, lies lower than a back end of the capsule, and that the capsule comes to rest in this position and, with respect to the movement direction, comes to rest solely as a result of static friction; and, weighing the capsule deposited in an inclined manner.

The invention is first of all based on the finding that capsules with different degrees of filling react with different sensitivities to reductions in the weighing cycle rates. Thus, it was first of all found that completely filled capsules can be weighed exactly in a relatively short time, while partially filled capsules require a comparatively longer time therefor. This led to the further finding according to the invention that the filling of partially filled capsules still exhibits dynamic behavior even when the process of braking and depositing the capsule on the weighing receptacle has already been completed per se. As a result of the initially acting deceleration during stopping, the filling collects at the front end, in the direction of movement, of the capsule. Following deposition on the weighing receptacle, the pulverulent or granular filling that has collected at the front of the capsule trickles at least partially back onto the capsule wall located at the bottom in the weight force direction, wherein a slope with a particular slope angle is produced in the manner of a bulk material. This process of trickling back, possibly in conjunction with formation of a slope, takes up a certain amount of time while the capsule is already lying on the weighing receptacle. As long as the filling is still moving inside the capsule, the measurement results of a weighing operation are distorted. Therefore, the invention is based on the finding that rapid and exact weighing of the entire capsule can only be carried out when, firstly, both the capsule shell and the filling have come to rest and when, secondly, comparable rest positions can be achieved for all capsules.

On this basis, a device is provided in which the receiving section of the weighing receptacle is configured as a friction support and is inclined with respect to a horizontal direction such that a front end, with regard to the direction of movement, of the receiving section is located lower down than a rear end of the receiving section. In an associated method according to the invention, a capsule filled at least partially with the filling is transported up to the weighing unit or scale in the direction of movement via a capsule transporter. Upon reaching the weighing unit, the capsule is stopped from moving in the direction of movement via a stopping device. The stopped capsule is deposited in a receiving section of the weighing receptacle in an inclined manner such that a front end, with regard to the abovementioned direction of movement, of the capsule is located lower down than a rear end of the capsule. The configuration of the weighing receptacle as a friction support means that the capsule comes to rest on the weighing receptacle in its inclined position and with regard to the direction of movement solely under the action of static friction. Therefore, no stops, stoppers or other form-fitting positioning means that act in the direction of movement and secure the capsule in the direction of movement during weighing are provided. The capsule deposited in such an inclined manner is then weighed.

Although the stopping of the capsule can take place in a form-fitting manner for example using an outfeed lever. However, the subsequent simple lying of the capsules solely under the action of static friction results in reliable reproducibility of the capsule orientation during weighing. It is possible to reliably rule out a situation in which individual capsules come to rest in an upright position rather than lying, as desired. For all capsules, the same boundary conditions thus apply during weighing. On account of the inclination according to an aspect of the invention of the receiving section of the weighing receptacle and the inclined deposition according to an aspect of the invention of the capsule thereon, the time period in which the filling trickles or flows back out of the front stopped position after the capsule has been stopped can be reduced considerably. Depending on the coordination of the individual parameters such as powder properties, inclination angle and the like, it may even be possible to achieve a situation in which the formation of a slope does not occur at all and nothing trickles back. At any rate, compared with the prior art, considerably shorter waiting times need to be maintained before reliable weighing can be carried out. It may even be possible for such waiting times to be dispensed with entirely. The actual process of weighing itself can be kept very short, such that subsequent capsules can be transported up for weighing in very short time intervals. Overall, a considerable shortening of the cycle rates and thus a corresponding increase in the output quantity can be achieved. Nevertheless, very tight mass tolerances of for example ±2 mg can be maintained during weighing.

In this case, it is necessary to find a good compromise between little movement of the filling and little tendency of the capsule to slide on the inclined support surface. Consideration should be given to the fact that high inclination angles are useful for a still behavior of the filling, while, in contrast thereto, low inclination angles of the receiving section of the weighing receptacle result in less of a tendency of the capsule deposited thereon to slide. The angle of the abovementioned inclination of the receiving section of the weighing receptacle relative to the horizontal direction is therefore advantageously in a range from 5° to 25°, inclusive, preferably in a range from 8° to 20°, inclusive, and in particular in a range from 11° to 17°, inclusive. In the angular ranges, it is possible to ensure that the capsule is held by a friction fit and maintains its intended position without sliding. Depending on the capsule geometry and trickling or flow behavior of the filling, it was also possible to observe very rapid settling in the angular ranges, and so short waiting times down to no waiting time at all was/were necessary from capsule deposition to the start of measuring. To this end, in a first preferred embodiment, the inclination angle is 17°±2°, this having been found to be a good compromise with an emphasis on little filling movement. In a second preferred embodiment, the inclination angle is 11°±2°. In this case, a reduced tendency of the capsule to slide together with a still suitably low filling movement is achieved.

In an advantageous embodiment of the invention, the capsule transporter is configured as a rotatable transport wheel, wherein the weighing receptacle has the shape of a partial circle extending in the direction of movement. The partial circle shape allows, if required, a variation in the inclination angle simply by the capsules being fed out of the capsule transporter and deposited at a slightly earlier or slightly later rotation angle of the transport wheel. In this way, the inclination angle can be adapted during weighing practically without structural changes. Furthermore, the partial circle shape makes it easier to remove the weighed capsule in a controlled manner.

In an advantageous embodiment, the receiving section is formed by two partial-surface sections, wherein the two partial-surface sections are inclined in a manner facing one another as seen in the cross section of the receiving section. In a preferred embodiment, the two partial-surface sections enclose a dihedral angle which is in a range from 120° to 60°, inclusive, and in particular is at least approximately 90°. As a result of the channel shape formed thereby, not only lateral guidance of the capsule is achieved. Rather, the two inclined partial-surface sections form from the supporting forces, a force parallelogram with mutually facing force components which, at a given inclination angle and coefficient of friction, result in an increased holding force on the capsule. The tendency of the latter to slide is reliably overcome.

BRIEF DESCRIPTION OF THE DRAWINGS

The invention will now be described with reference to the drawings wherein:

FIG. 1 shows a schematic end view of a device for weighing capsules according to the prior art during the horizontal braking of the capsule transported up to the weighing unit;

FIG. 2 shows an enlarged detail illustration of the arrangement according to FIG. 1 in the region of the weighing unit with a capsule deposited horizontally thereon, forming a bulk material slope of the filling in the interior of the capsule;

DESCRIPTION OF THE PREFERRED EMBODIMENTS OF THE INVENTION

Figure 3:
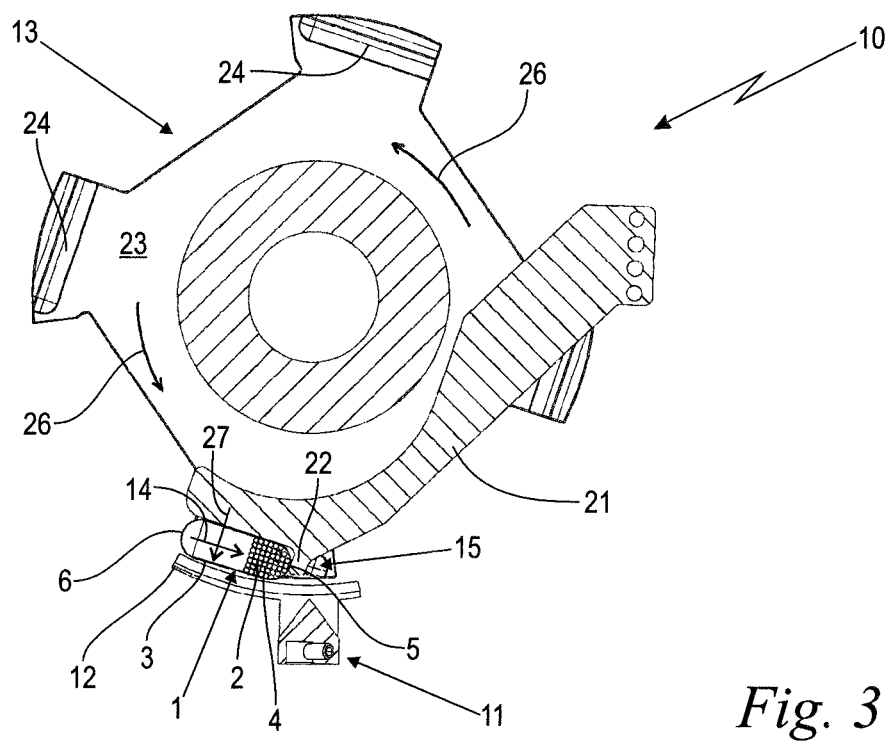
FIG. 3 shows a schematic front view of a device, embodied according to the invention, for weighing capsules during the inclined braking of a transported-up capsule.
Figure 4:
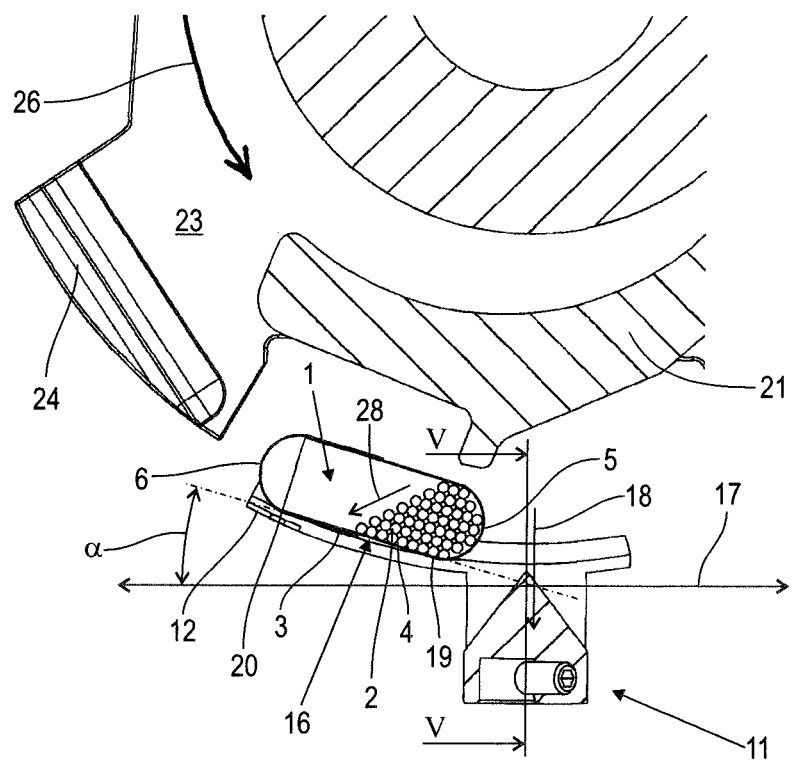
FIG. 4 shows an enlarged detail view of the arrangement according to FIG. 3 in the region of the weighing unit with an inclined receiving section and a capsule deposited in an inclined manner thereon, forming a reduced bulk material slope; and, FIG. 5 shows a cross-sectional illustration of the weighing receptacle of the arrangement according to FIG. 4 with details of partial-surface sections for supporting the capsule, which are inclined in a manner facing one another.

FIGS. 1 and 2 show a device 10' for weighing capsules 1 having a filling 2 according to the prior art. FIGS. 3 and 4 show comparable views of a device 10, modified according to aspects of the invention, for the same purpose, wherein identical features are provided with the same reference signs. For the sake of simplicity, both devices 10', 10 and the methods carried out therewith are described jointly inasmuch as the same information applies to both. Only the differences are explicitly noted. Thus, where not associated expressly with the prior art or the modification according to the invention, the following text applies to both embodiments. The devices 10, 10' are shown in a conventional, upright operating position relative to a horizontal direction 17 and a weight force direction 18 orthogonal thereto. The weight force direction 18 corresponds to the direction of gravitational force or of gravitational acceleration.

The capsule 1 to be weighed is shown in this case for example as a two-piece capsule having a bottom capsule part 4 and a plugged-on upper capsule part 3. However, other, for example completely closed capsule forms can also come into consideration. The capsule 1 contains a filling 2 with graphically represented grains, indicating that the filling is a powder, granules or the like. However, in the context of the invention, liquids can also be provided as filling 2. In any case, the fillings 2 are primarily ones which have flowing or flow-like properties. Furthermore, it is also clear from FIG. 1 that the capsule 1 is only partially filled, that is, the filling 2 does not completely fill the interior of the capsule 1. However, with a method according to the invention and a device according to the invention, completely filled capsules 1 can also be weighed.

FIGS. 1 and 3 each show a schematic front view of a device 10, 10'. The devices 10, 10' each include a weighing unit 11, 11' having a weighing receptacle 12, 12' for in each case one capsule 1 to be weighed, and a capsule transporter 13 for transporting individual capsules 1 up to the respective weighing unit 11, 11'. The capsule transporters 13 are configured, in the embodiment shown, as rotating transport wheels 23 with capsule clips 24 arranged all around the axis of rotation. However, within the context of the invention, the capsule transporter can also be a linear conveyor unit or the like. In operation, the capsule clips 24 accommodate individual and ready-filled capsules 1 in order to hold them during transport to the weighing unit 11, 11'. However, for a clear illustration, the capsule clips 24 are illustrated empty here, while only one capsule 1 is located in the immediate area of the weighing unit 11, 11'.

The capsule transporter 13 or the transport wheel 23 is operated with a continuously uniform speed of movement or rotation corresponding to an arrow 26, meaning that the capsules 1 held in the capsule clips 24 also have a corresponding speed of movement, specifically immediately upon reaching the respective weighing unit 11, 11' in an associated direction of movement 14, 14'. The devices 10, 10' include stopping devices 15 for the capsule 1 transported up to the weighing unit 11, 11' in each case in the direction of movement 14, 14'. The capsules 1 that are stopped thereby, with the transport wheel 23 otherwise continuing to rotate, are subsequently deposited on the respective weighing receptacle 12, 12' of the weighing unit 11, 11'. This deposition takes place along arrows 27, 27' in a direction which is approximately perpendicular to the abovementioned direction of movement 14, 14'. For stopping and deposition, an outfeed lever 21 is provided which is provided with a stopping lug 22 in order to form the stopping device 15. As the respective capsule clip 24 draws near, the outfeed lever 21 pivots from above into the path of movement of the transported-up capsule 1. The capsule 1 consequently gets caught with its front end 5, in the direction of movement 14, 14', against the stop lug 22 in a form-fitting manner, while it is simultaneously pushed downward to the weighing receptacle 12, 12' and comes to rest there.

It is also discernible from FIGS. 1 and 3 that the stopping of the capsules 1 counter to the respective direction of movement 14, 14' also results in the filling 2 within the capsule 1 being braked. As a result of the acting inertia forces, the filling 2 collects in the region of the front end 5 of the capsule 1, while, in the case of the capsule 1 that is illustrated in a partially filled manner here, the rear end 6 thereof is free. FIGS. 2 and 4 show an enlarged detail illustration of the capsules 1 after they have been deposited on the respective weighing receptacle 12, 12' of the associated weighing unit 11, 11'. The outfeed lever 21 has been raised to such an extent that it is no longer in contact with the capsule 1. From this moment, a time window starts, within which the weighing of the capsule 1 has to take place. The time window ends as soon as the capsule transporter 13 comes back into contact with the capsule 1—in this case for example via the subsequent capsule clip 24—and pushes the capsule down from the weighing receptacle 12, 12' of the weighing unit 11, 11'.

However, it is also clear from FIGS. 2 and 4 that the filling 2 within the capsule 1 flows or trickles back at least partially from the region of the front end 5 onto the lower wall region, in the weight force direction 18, of the capsule 1 after the braking or stopping according to FIGS. 1 and 3, as is indicated by arrows 28, 28'. In the case of pulverulent or granular fillings 2, a surface inclined in the manner of a slope can form. Only after this has occurred, that is, after the filling 2 has come to rest, can weighing be carried out with sufficient precision. The time interval that the filling 2 needs in order to come to rest is thus lost within the abovementioned time window for carrying out the weighing operation.

The weighing receptacles 12, 12' each have a receiving section 16, 16' within which the capsule 1 is deposited. As a reference for the orientation of the respective receiving section 16, 16' and of the capsule 1, the horizontal direction 17 and, perpendicularly thereto, the weight force direction 18 during normal operation are indicated, to which reference is made here. In the prior art according to FIGS. 1 and 2, the receiving section 16' is oriented in a substantially horizontal manner, that is, parallel to the horizontal direction 17.

Accordingly, the capsule 1 also lies on the receiving section 16' with its longitudinal axis substantially horizontal. It is also discernible from FIG. 1 that the capsule 1 transported up to the weighing unit 11' is stopped at the moment at which the capsule 1 is parallel to the receiving section 16', and wherein its direction of movement 14' is likewise horizontal. According to FIG. 1, the capsule 1 is then transferred from the capsule transporter 13, in this case from the capsule clip 24 of the transport wheel 23, in a transfer direction which is indicated by an arrow 27' and which lies approximately in the weight force direction 18. From the horizontal orientation of the capsule 1 while it is being stopped, while it is being transferred to the weighing unit 11' and while it is being supported on the receiving section 16' of the weighing receptacle 12', there follows a marked relocation of the filling 2 within the capsule 1 from the front end 5 during stopping according to FIG. 1 back to the lower capsule wall along the arrow 28' according to FIG. 2, with the result that reliable weighing of the capsule 1 can only be carried out after a certain settling phase.

In contrast to the prior art according to FIGS. 1 and 2, embodiments of the invention according to FIGS. 3 and 4 provide for inclined positioning of the capsule 1. The device 10 is configured to deposit the capsule 1 stopped according to FIG. 3 in a particular receiving section 16 of the weighing receptacle 12. According to FIG. 3, the capsule 1 is transported up to the weighing unit 11 in a direction of movement 14 which, at the moment at which the capsule 1 has reached the receiving section 16, is parallel to the inclined receiving section 16. With respect to this direction of movement 14, the receiving section 16 has a front end 19 and a rear end 20. It is clear in particular from FIG. 4 that the receiving section 16 is inclined with respect to the horizontal direction 17 such that its front end 19 is located lower down in the weight force direction 18 than its rear end 20. According to FIG. 4, the capsule 1 rests with its front end 5 on the front end 19 and with its rear end 6 on the rear end 20 of the receiving section 16. Measured through the front end 19 and the rear end 20, the receiving section 16 is inclined with respect to the horizontal direction 17 at an inclination angle α which is advantageously in a range from 5° to 25°, inclusive, preferably in a range from 8° to 20°, inclusive, and in particular in a range from 11° to 17°, inclusive. In the embodiment shown, the inclination angle α is about 11°±2°, but can also be for example about 17°±2°. The same also goes for the inclination of the capsule 1 deposited thereon, the front end 5 of which is located lower down in the weight force direction 18 than its rear end 6.

In connection with the embodiment of the capsule transporter 13 as a rotatable transport wheel 23, the weighing receptacle 12 has, in the plane shown here and defined by the horizontal direction 17 and the weight force direction 18, the shape of a partial circle extending in the direction of movement 14. As a result of suitable synchronization of the stopping of the capsule 1 with the rotary movement of the transport wheel 23, the deposition site of the capsule 1 on the weighing receptacle 12 can be varied, that is, be shifted further to the left or to the right in the illustration according to FIGS. 3 and 4. As a result, the above-described inclination angle α then also changes and can be adapted to the respective requirements in this way.

It is also discernible that the weighing receptacle 12 is configured as a friction support. This means, in other words, that, after the lifting of the outfeed lever 21 and in particular during the weighing operation in the inclined position of the capsule 1, the latter maintains its intended position, measured in the direction of movement 14, solely under the action of its weight force and the resultant static friction on the inclined receiving section 16 of the weighing receptacle 12. It maintains this position without sliding in the direction of movement 14 and without stops or other form-fitting positioning means being present on the weighing receptacle 12 in order to prevent any sliding in the direction of movement 14. The lack of such stops or the like also favors an above-described variation in the capsule position and inclination during weighing.

It is also discernible from viewing FIGS. 3 and 4 together that the direction of movement 14 and also the longitudinal axis of the capsule 1 are already inclined equally relative to the horizontal direction 17 upon reaching the receiving section 16. The direction of the transfer, carried out perpendicularly thereto, of the capsule 1 from the capsule transporter 13 to the weighing unit 11 in accordance with the arrow 27 is inclined to the same extent relative to the weight force direction 18.

It is also discernible from viewing FIGS. 3 and 4 together that, although, under certain circumstances—just as in the prior art according to FIGS. 1 and 2—shifting of the filling 2 from the stopped state according to FIG. 3 into the deposited state according to FIG. 4 takes place in accordance with the arrow 28, it is clear from comparing the embodiment of the invention according to FIG. 4 with the prior art according to FIG. 2 that this shifting of the filling 2 in the embodiment of the invention along the arrow 28 (FIG. 4) is much less pronounced than in the prior art along the arrow 28' (FIG. 2). Under certain circumstances, it is even possible for such a movement or shifting of the filling 2 not to take place at all, depending on the type of filling 2. In any case, the time period that is required for this purpose is much shorter in the case of a device according to the invention and a method according to the invention that is described here than in the prior art. Of the entire time window between deposition of the capsule 1 on the receiving section 16 and the subsequent removal of the capsule 1 therefrom, there is a comparatively greater amount therefore available, within which the capsule 1 as a whole, including its filling 2, has come to rest, that is, within which undistorted weighing can be carried out.

Figure 5:
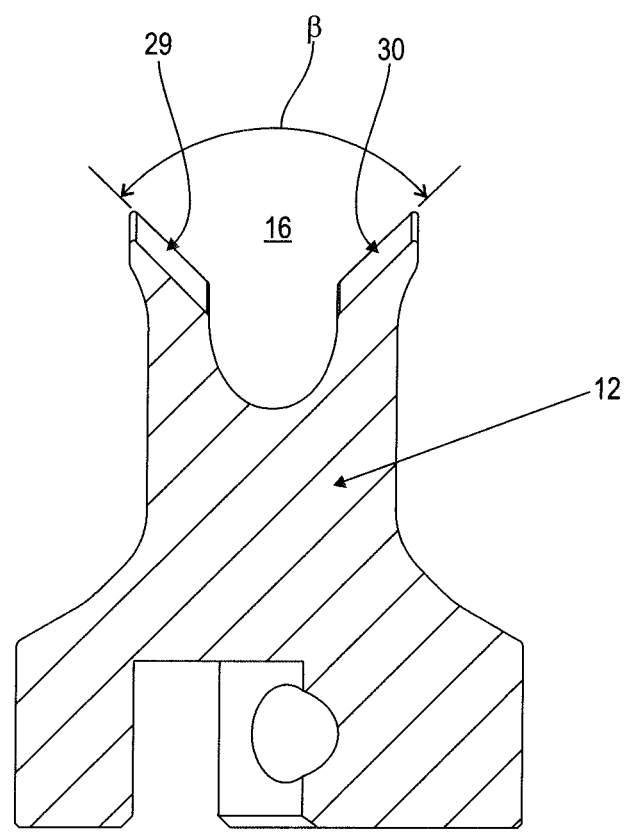

FIG. 5 additionally shows the receiving section 16 of the weighing receptacle 12 according to FIG. 4 in a cross-sectional illustration along the section line V-V shown therein. According to the figure, the receiving section 16 is formed by two partial-surface sections 29, 30 on which the capsule 1, not shown here, (FIG. 4) rests centrally. The two partial-surface sections 29, 30 are inclined in a manner facing one another as seen in the cross section of the receiving section 16. This means that they enclose a dihedral angle β with a value of less than 180°. The dihedral angle β is preferably in a range from 120° to 60°, inclusive, and, in the preferred embodiment shown, is at least approximately 90°. As a result, the capsule is held in a form-fitting manner in the lateral direction transverse to the direction of movement 14 (FIG. 3). Furthermore, supporting forces with force components directed towards one another arise, which increase the static friction between the capsule 1 (FIG. 4) and receiving section 16 and as a result favor the selection of larger inclination angles α. However, a planar supporting surface that lies horizontally in cross section, corresponding to a dihedral angle β=180°, in particular with lateral supports for the capsule 1 (FIG. 4), may also be expedient.

An embodiment of the invention is illustrated here for example in single-track operation with only one capsule transporter 13 and only one weighing unit 11. In operation in practice, however, multitrack embodiments which run in parallel and in which a corresponding number of capsule transporters 13 and weighing units 11 for the simultaneous and parallel testing of a plurality of capsules 1 are arranged alongside one another, may readily be suitable.

It is understood that the foregoing description is that of the preferred embodiments of the invention and that various changes and modifications may be made thereto without departing from the spirit and scope of the invention as defined in the appended claims.

What is claimed is:

1. A device for weighing capsules with a filling, the device comprising:
   a weighing unit having a weighing receptacle for a capsule;
   a capsule transporter configured to transport an individual one of the capsules to said weighing unit in a movement direction;
   a stop arrangement for the individual one of the capsules transported in said movement direction;
   said weighing receptacle having a receiving section including a front end and a back end with respect to the movement direction;
   said stop arrangement being configured to deposit a stopped individual one of the capsules in said receiving section; and,
   said receiving section of said weighing receptacle being configured as a friction support and being inclined with respect to the horizontal direction such that said front end of said receiving section lies lower than said back end of said receiving section.

2. The device of claim 1, wherein said receiving section of said weighing receptacle is inclined at an inclination angle $\alpha$ with respect to the horizontal direction; and, said inclination angle $\alpha$ lies in a range from 5° up to and including 25°.

3. The device of claim 1, wherein said receiving section of said weighing receptacle is inclined at an inclination angle $\alpha$ with respect to the horizontal direction; and, said inclination angle $\alpha$ lies in a range from 8° up to and including 20°.

4. The device of claim 1, wherein said receiving section of said weighing receptacle is inclined at an inclination angle $\alpha$ with respect to the horizontal direction; and, said inclination angle $\alpha$ lies in a range from 11° up to and including 17°.

5. The device of claim 1, wherein said capsule transporter is a rotatable transport wheel; and, said weighing receptacle includes a partial annular shape extending in the movement direction.

6. The device of claim 1, wherein said receiving section is formed from two partial surface sections; and, both of said two partial surface sections are inclined toward each other when said receiving section is viewed in cross section.

7. The device of claim 6, wherein said two partial surface sections enclose a surface angle $\beta$ lying in a range from 120° up to and including 60°.

8. The device of claim 6, wherein said two partial surface sections enclose a surface angle $\beta$ of approximately 90°.

9. A method for weighing capsules with a filling via a device including a weighing unit having a weighing receptacle for a capsule, a capsule transporter configured to transport an individual one of the capsules to the weighing unit in movement direction, a stop arrangement for the individual one of the capsules transported in the movement direction, the weighing receptacle having a receiving section including a front end and a back end with respect to the movement direction, the stop arrangement being configured to deposit a stopped individual one of the capsules in the receiving section, and, the receiving section of the weighing receptacle being configured as a friction support and being inclined with respect to the horizontal direction such that the front end of the receiving section lies lower than the back end of the receiving section; the method comprising the steps of:
   transporting a capsule at least partially filled with the filling via the capsule transporter to the weighing unit in a movement direction;
   stopping the capsule in its movement in the movement direction via the stop arrangement when the weighing unit is reached;
   depositing the stopped capsule in the receiving section in an inclined manner such that a front end of the capsule, with respect to the movement direction, lies lower than a back end of the capsule, and that the capsule comes to rest in this position and, with respect to the movement direction, comes to rest solely as a result of static friction; and,
   weighing the capsule deposited in an inclined manner.

* * * * *